(12) United States Patent
Shin et al.

(10) Patent No.: US 11,485,023 B2
(45) Date of Patent: Nov. 1, 2022

(54) ROBOT CONTROLLING METHOD USING PORTABLE DEVICE INCLUDING TOUCHSCREEN

(71) Applicant: AJINEXTEK CO., LTD., Daegu-si (KR)

(72) Inventors: ManSoo Shin, Daegu-si (KR); SimDong Kim, Daegu-si (KR)

(73) Assignee: AJINEXTEK CO., LTD., Daegu-si (KR)

(*) Notice: Subject to any disclaimer, the term of this patent is extended or adjusted under 35 U.S.C. 154(b) by 87 days.

(21) Appl. No.: 17/088,906

(22) Filed: Nov. 4, 2020

(65) Prior Publication Data
US 2021/0170606 A1    Jun. 10, 2021

(30) Foreign Application Priority Data

Dec. 10, 2019  (KR) .......................... 10-2019-0164207

(51) Int. Cl.
*G06F 3/01*    (2006.01)
*G06F 3/0482*    (2013.01)
(Continued)

(52) U.S. Cl.
CPC ............. *B25J 13/06* (2013.01); *B25J 9/1674* (2013.01); *B25J 13/006* (2013.01); *B25J 13/088* (2013.01);
(Continued)

(58) Field of Classification Search
CPC ........ B25J 13/06; B25J 13/006; B25J 13/088; B25J 9/1674; G06F 3/017; G06F 3/0482;
(Continued)

(56) References Cited

U.S. PATENT DOCUMENTS

2004/0227737 A1* 11/2004 Novak .................. A61G 13/02
                                                                 606/1
2009/0109231 A1* 4/2009 Kim ....................... G06F 9/451
                                                                 345/581
(Continued)

FOREIGN PATENT DOCUMENTS

JP       09-085660 A      3/1997
JP       2004-355195 A    12/2004
(Continued)

OTHER PUBLICATIONS

Evans III et al., "Control Solutions for Robots Using Android and iOS Devices", Proceedings of SPIE—The International Society for Optical Engineering, May 2012. (Year: 2012).*

*Primary Examiner* — Reza Nabi
*Assistant Examiner* — Hwei-Min Lu
(74) *Attorney, Agent, or Firm* — Studebaker & Brackett PC

(57) ABSTRACT

A method for controlling a robot device using a portable terminal including a touchscreen is provided. The method includes displaying an enable button in a first area of the touchscreen, displaying an emergency stop button in a second area of the touchscreen, displaying a plurality of robot control buttons in a third area of the touchscreen, in response to simultaneously receiving from a user an input on the first area and an input on the third area, transmitting a robot control signal to a control device configured to control the robot device, and in response to receiving an input from the user on the second area, transmitting an emergency signal to the control device.

8 Claims, 7 Drawing Sheets

(51) Int. Cl.
  *G06F 3/04845* (2022.01)
  *G06F 3/04886* (2022.01)
  *G06F 3/16* (2006.01)
  *B25J 13/06* (2006.01)
  *B25J 9/16* (2006.01)
  *B25J 13/00* (2006.01)
  *B25J 13/08* (2006.01)

(52) U.S. Cl.
  CPC ............ *G06F 3/017* (2013.01); *G06F 3/0482* (2013.01); *G06F 3/04845* (2013.01); *G06F 3/04886* (2013.01); *G06F 3/16* (2013.01)

(58) Field of Classification Search
  CPC ............... G06F 3/0481; G06F 3/04845; G06F 3/04886; G06F 3/16
  USPC ........ 700/264; 715/700, 863, 810, 815, 764, 715/765, 781, 864, 728, 965

See application file for complete search history.

(56) References Cited

U.S. PATENT DOCUMENTS

| | | | |
|---|---|---|---|
| 2013/0212535 | A1* | 8/2013 | Kim ...................... G06F 3/0484 715/841 |
| 2015/0082162 | A1* | 3/2015 | Cho .................... G06F 3/04842 715/810 |
| 2015/0085986 | A1* | 3/2015 | Dinse ..................... A61B 6/548 378/98 |
| 2015/0174767 | A1* | 6/2015 | Som ........................ B25J 13/06 700/257 |
| 2016/0065413 | A1* | 3/2016 | Sundermeyer .......... H04L 67/75 370/254 |
| 2017/0076194 | A1* | 3/2017 | Versace .................... G06N 3/02 |
| 2017/0248946 | A1* | 8/2017 | Ogura .................. A01B 69/008 |
| 2017/0322721 | A1* | 11/2017 | Thakur ................. G06F 3/0488 |
| 2019/0034025 | A1* | 1/2019 | Izumi ................... G05B 19/042 |
| 2021/0252713 | A1* | 8/2021 | Mimura ................. B25J 13/081 |

FOREIGN PATENT DOCUMENTS

| | | |
|---|---|---|
| JP | 2016-060018 A | 4/2016 |
| JP | 2019-028769 A | 2/2019 |
| JP | 2019-155546 A | 9/2019 |

\* cited by examiner

ROBOT CONTROLLING METHOD USING PORTABLE DEVICE INCLUDING TOUCHSCREEN

CROSS-REFERENCE TO RELATED APPLICATION

This application claims priority under 35 U.S.C § 119 to Korean Patent Application No. 10-2019-0164207 filed on Dec. 10, 2019 in the Korean Intellectual Property Office, the entire contents of which are hereby incorporated by reference.

TECHNICAL FIELD

The present disclosure relates to a method for controlling a robot using a portable terminal including a touchscreen, and more specifically, to providing a user interface for robot controlling using a portable terminal.

BACKGROUND ART

The large-scale manufacturing process, in-line manufacturing, and increased automation facilities have led into the rapid increase in the use of industrial robots at the industrial sites. As a method for training robots at the industrial sites, a method such as direct training or training using teaching pendant is used. Meanwhile, recently, in addition to a dedicated pendant, a method for controlling the operation of a robot using various control devices such as smartphones, tablet PCs, joysticks, keyboards and so on has been introduced.

In the case of a dedicated pendant, it is implemented in consideration of the safety of user such that the user is able to control the robot only by pressing an operation button while pressing the enable button that is implemented as a physical button at the same time. On the other hand, many robot control methods using tablet PCs or the like developed recently are designed without considering the safety of the users. In this case, the user can be placed in a dangerous situation by a robot control command input contrary to the user's intention, or the user may not able to be fast enough to stop the robot in an emergency situation, and a safety accident can occur.

SUMMARY

In order to solve the problems described above, the present disclosure provides a method for controlling a robot device.

There is provided a method for controlling a robot device, with which it is possible to use a user interface optimized for each user, since a user can adjust positions, sizes, and shapes of an enable button and an emergency stop button according to his or her preference at a user terminal.

In addition, there is provided a method for controlling a robot device, which is capable of quickly responding to an emergency situation by, in response to detecting a registered posture of the user terminal, impact and shaking of the user terminal, a user gesture, a voice command, and the like by an accelerometer, an image sensor, a sound sensor, and the like of the user terminal, transmitting an emergency signal for stopping the operation of the robot device.

The present disclosure may be implemented in various ways, including a computer readable storage medium that stores a method, a system, an apparatus, or instructions.

The method for controlling a robot device using a portable terminal including a touchscreen according to an exemplary embodiment may include displaying an enable button in a first area of the touchscreen, displaying an emergency stop button in a second area of the touchscreen, displaying a plurality of robot control buttons in a third area of the touchscreen, in response to simultaneously receiving from a user an input on the first area and an input on the third area, transmitting a robot control signal to a control device configured to control the robot device, and in response to receiving an input from the user on the second area, transmitting an emergency signal to the control device. In this case, the emergency signal may be a signal for stopping operation of the robot device.

According to an embodiment, the third area may be located in a central area of the touchscreen, and the first area and the second area may be located in a border area surrounding the central area.

According to an embodiment, in a right-handed mode of the portable terminal, the enable button may be displayed on a left side of the touchscreen, and the emergency stop button may be displayed on a right side of the touchscreen. In addition, in a left-handed mode of the portable terminal, the enable button may be displayed on the right side of the touchscreen, and the emergency stop button may be displayed on the left side of the touchscreen.

According to an embodiment, a method for controlling a robot device may further include displaying a plurality of guide blocks on the border area, receiving, from the user, a first user input for selecting at least one of the plurality of guide blocks, displaying the enable button in the first area based on the first user input, receiving, from the user, a second user input for selecting at least one of the plurality of guide blocks, and displaying the emergency stop button in the second area based on the second user input.

According to an embodiment, the size of the first area for displaying the enable button is changeable by the user, and the size of the second area for displaying the emergency stop button is changeable by the user.

According to an embodiment, the shape of the first area for displaying the enable button is changeable by the user, and the shape of the second area for displaying the emergency stop button is changeable by the user.

According to an embodiment, a method for controlling a robot device may further include, in response to detecting, by an accelerometer of the portable terminal, a fall, or a shaking of the portable terminal of a predetermined threshold value or above, or a predetermined posture, transmitting an emergency signal to the control device.

According to an embodiment, the method for controlling a robot device may further include, in response to detecting a predetermined gesture by an image sensor of the portable terminal, transmitting an emergency signal to the control device.

According to an embodiment, the method for controlling a robot device may further include, in response to detecting a predetermined voice command by a sound sensor of the portable terminal, transmitting an emergency signal to the control device.

According to an embodiment, the portable terminal may be a general-purpose tablet computer.

BRIEF DESCRIPTION OF THE DRAWINGS

Embodiments of the present disclosure will be described with reference to the accompanying drawings described below, where similar reference numerals indicate similar components, but not limited thereto, in which.

DETAILED DESCRIPTION OF THE INVENTION

Figure 1:
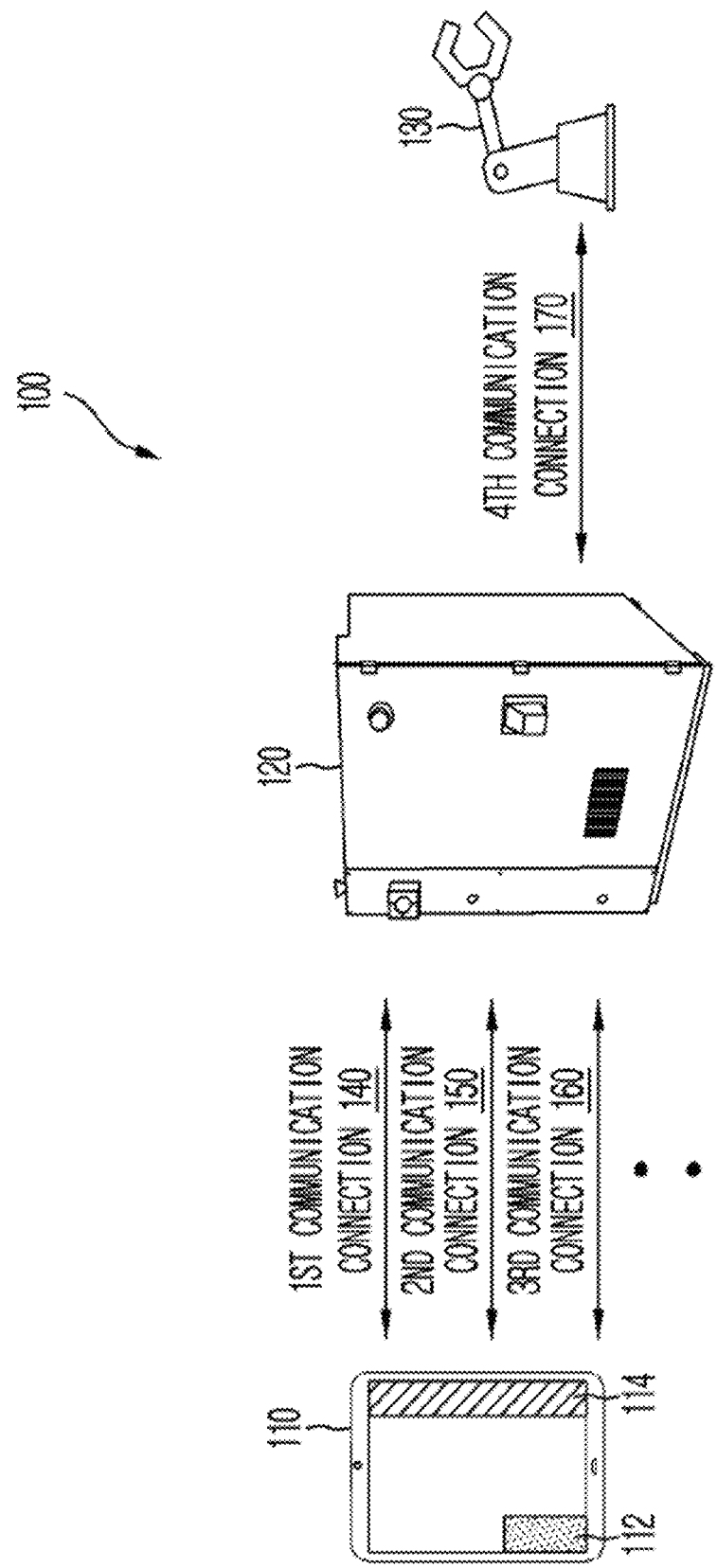
FIG. 1 is a diagram illustrating a robot device controlling system using a portable terminal including a touchscreen according to an exemplary embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding components are given the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the embodiments are merely provided to make the present disclosure complete, and to fully disclose the scope of the invention to those skilled in the art to which the present disclosure pertains.

The terms used herein will be briefly described prior to describing the disclosed embodiments in detail.

The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of the embodiments. Therefore the terms used in the present disclosure should be defined based on the meaning of the terms and the overall contents of the present disclosure rather than a simple name of each of the terms.

As used herein, the singular forms 'a,' 'an,' and 'the' are intended to include the plural forms as well, unless the context clearly indicates the singular forms. Further, the plural forms are intended to include the singular forms as well, unless the context clearly indicates the plural forms.

Further, throughout the description, when a portion is stated as "comprising (including)" a component, it intends to mean that the portion may additionally comprise (or include or have) another component, rather than excluding the same, unless specified to the contrary.

FIG. 1 is a diagram illustrating a robot device controlling system 100 using a portable terminal including a touchscreen according to an exemplary embodiment. As illustrated, the portable terminal 110 may be configured to communicate with a control device 120 through a plurality of first to third communication connections 140, 150, and 160. The control device 120 may be configured to communicate with a robot device 130 through a fourth communication connection 170.

According to the present disclosure, the portable terminal 110 may be any device that includes a touchscreen capable of outputting data to a user and receiving a touch input from the user, and a plurality of communication modules capable of communicating with external devices. For example, the portable terminal 110 may be a general-purpose tablet computer, a smart phone, a laptop computer, and the like. The user may input a command for controlling the robot device 130 using the portable terminal 110. The command input by the user to the portable terminal 110 may be transmitted to the robot device 130 via the control device 120.

In an embodiment, an enable button 112 and an emergency stop button 114 may be displayed on the touchscreen of the portable terminal 110. In the present disclosure, the enable button 112 refers to a button for transmitting a command for controlling the robot device 130 to the control device 120, and when the user touches the robot control button (not shown) while touching on the enable button 112, a robot control command corresponding to the robot control button may be transmitted from the portable terminal 110 to the robot device 130 via the control device 120. That is, while receiving the touch input on the enable button 112 area from the user, the portable terminal 110 may transmit the robot control command to the control device 120 in response to receiving an input on the robot control button area. On the other hand, the portable terminal 110 may not transmit the robot control command to the control device 120 when receiving only the input on the robot control button area.

In the present disclosure, the emergency stop button 114 is a button for stopping all operations of the robot device 130, and when the user touches the emergency stop button 114, the portable terminal 110 may transmit an emergency signal to the control device 120, and the control device 120 may transmit an emergency stop command to the robot device 130. That is, the portable terminal 110 may transmit the emergency signal to the control device 120 in response to receiving a touch input on the emergency stop button 114 area from the user. Unlike the other robot control buttons, the user is able to stop all operations of the robot device 130 by simply touching the emergency stop button 114 without having to touch the enable button 112 together, and this is for the user to easily and quickly stop the robot device 130 in an emergency situation.

The robot control button may be displayed in an area on the touchscreen where the enable button 112 and the emergency stop button 114 are not displayed, and a plurality of buttons may be displayed for precise control of the robot device 130. For example, the robot control button may include a jog dial, a mode change switch, a motor key, a lock key, a robot selection key, an operation mode key, a speed key, a cursor key, a stop key, an OK key, and the like.

As illustrated, in a right-handed mode of the portable terminal 110, the enable button 112 may be displayed on the left side of the touchscreen, and the emergency stop button 114 may be displayed on the right side. In this case, a user who generally uses the right hand may hold the portable terminal 110 in the left hand or both hands, and touch the robot control button with the right hand while simultaneously touching the enable button 112 with the left hand (e.g., with the thumb of the left hand). To this end, the enable button 112 may be placed on the left side of the lower end of the touchscreen.

In addition, the emergency stop button 114 may be placed on the right side such that, in the event of an emergency, the user is easily able to touch it with the right hand, which is the hand the user generally uses. In this case, a vertical length of the emergency stop button 114 may be greater than the vertical length of the enable button 112. For example, the vertical length of the emergency stop button 114 may be set to be the same as the vertical length of the touchscreen. Additionally or alternatively, a horizontal length of the emergency stop button 114 may be greater than the horizontal length of the enable button 112. In FIG. 1, the portable terminal 110 is displayed in a portrait mode, but not limited thereto, and when the portable terminal 110 is displayed in a landscape mode, the enable button 112 and the emergency stop button 114 may be rearranged to be displayed on the left and right sides of the touchscreen, respectively, while the user is holding the portable terminal 110.

A command input by the user through the touchscreen of the portable terminal 110 may be transmitted to the control device 120 through the first to third communication connections 140, 150, and 160. The first, second, and third communication connections 140, 150, and 160 between the portable terminal 110 and the control device 120 may be wired or wireless communication connections. For example, each of the first, second, and third communication connections 140, 150, and 160 may be a USB connection, a WiFi® connection, and a Bluetooth® connection. In addition, various communication methods such as Ethernet connection, mobile communication connection, ZigBee® connection, and so on may be used. In the figures, three communication connections are illustrated between the portable terminal 110 and the control device 120, but the present disclosure is not limited thereto, and more than three communication connections may be provided.

The control device 120 configured to control the robot device 130, and, in response to receiving a robot control command from the portable terminal 110, may transmit a corresponding command to the control device 120. In an embodiment, the control device 120 may include a plurality of communication modules for communicating with the portable terminal 110 and the robot device 130, a controller for generating a robot control signal for controlling the operation of the robot device 130, and the like. The fourth communication connection 170 between the control device 120 and the robot device 130 may be a wired or wireless communication connection. In an embodiment, the fourth communication connection 170 may be a wired communication connection for stable control of the robot device 130 and prevention of safety accidents. For example, the fourth communication connection 170 may be a USB connection, an Ethernet connection, and the like.

Figure 2:
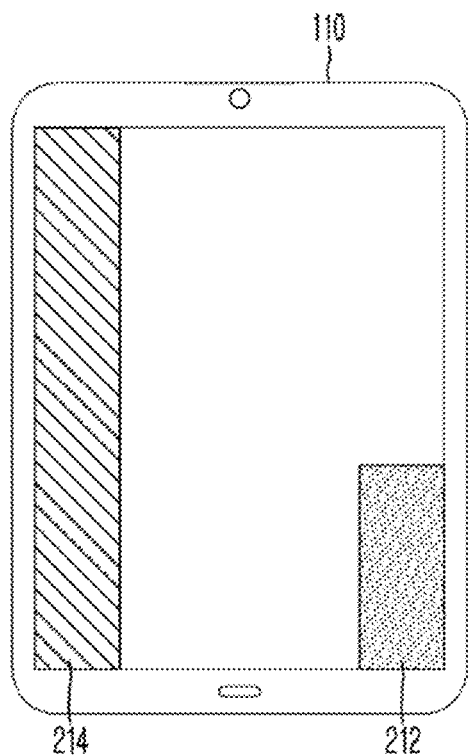
FIG. 2 is a diagram illustrating a left-handed mode of a portable terminal according to an exemplary embodiment.

FIG. 2 is a diagram illustrating a left-handed mode of the portable terminal 110 according to an exemplary embodiment. In an embodiment, the user may select one of a right-handed mode or a left-handed mode of the portable terminal 110. When the user selects the left-handed mode, an enable button 212 may be displayed on the right side of the touchscreen, and an emergency stop button 214 may be displayed on the left side.

A user who generally uses the left hand may hold the portable terminal 110 in the right hand or both hands, and touch the robot control button (not illustrated) with the right hand while simultaneously touching the enable button 212 with the right hand (e.g., with the thumb of the right hand). To this end, the enable button 212 may be placed on the right side of the lower end of the touchscreen.

In addition, the emergency stop button 214 may be placed on the left side such that, in the event of an emergency, the user is easily able to touch it with the left hand, which is the hand the user generally uses. In this case, the vertical length of the emergency stop button 214 may be greater than the vertical length of the enable button 212. For example, the vertical length of the emergency stop button 214 may be set to be the same as the vertical length of the touchscreen. Additionally or alternatively, the horizontal length of the emergency stop button 214 may be greater than the horizontal length of the enable button 212. In FIG. 2, the portable terminal 110 is displayed in a portrait mode, but not limited thereto, and when the portable terminal 110 is displayed in a landscape mode, the enable button 212 and the emergency stop button 214 may be rearranged to be displayed on the left and right sides of the touchscreen, respectively, while the user is holding the portable terminal 110.

Figure 3:
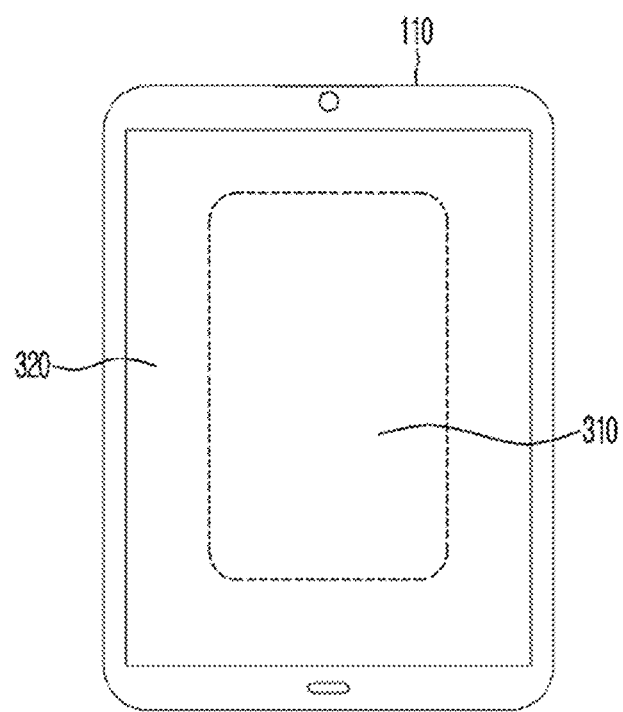
FIG. 3 is a diagram illustrating a central area in which robot control buttons are displayed, and a border area in which an enable button and an emergency stop button are displayed according to an exemplary embodiment.

FIG. 3 is a diagram illustrating a central area 310 in which robot control buttons are displayed, and a border area 320 in which the enable button and the emergency stop button are displayed according to an exemplary embodiment. The touchscreen of the portable terminal 110 of the present disclosure may be divided into the central area 310 and the border area 320 surrounding the central area. The robot control buttons may be displayed in the central area 310 of the touchscreen. For example, a jog dial, a mode change switch, a motor key, a lock key, a robot selection key, an operation mode key, a speed key, a cursor key, a stop key, an OK key, and the like may be displayed in the central area 310 of the touchscreen.

The enable button and the emergency stop button may be displayed in the border area 320 of the touchscreen. In an embodiment, the user may select the positions at which the enable button and the emergency stop button are displayed in the border area 320. In addition, the user may adjust the sizes of the enable button and the emergency stop button, or change the shapes of the enable button and the emergency stop button. That is, the user may freely customize the positions, sizes, and shapes of the enable button and the emergency stop button according to intended use and his or her preferences. The ratio of the central area 310 and the border area 320 on the touchscreen, and sizes and shapes thereof may also be changed as selected by the user.

Figure 4A:
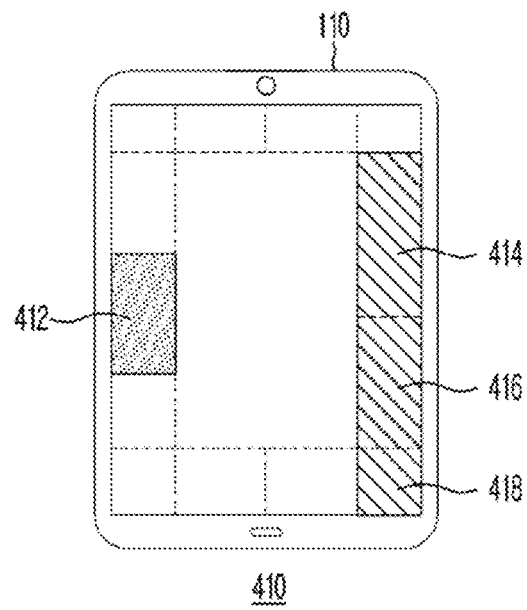
FIGS. 4A and 4B are diagrams illustrating a method for placing an enable button and an emergency stop button by a user according to an exemplary embodiment.
Figure 4B:
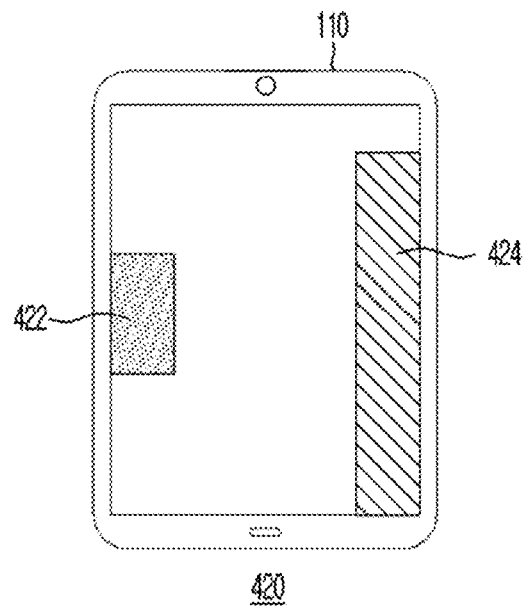

FIGS. 4A and 4B are diagrams illustrating an example in which the user places an enable button 422 and an emergency stop button 424 according to an exemplary embodiment. In FIGS. 4A and 4B, first and second operation steps 410, 420 of the portable terminal 110 are illustrated. The first operation step 410 represents, while the border area is divided and displayed into a plurality of guide blocks, receiving a selection of the guide blocks where the enable button and the emergency stop button are to be placed.

In the first operation step 410, the user may select one guide block 412 for the area where the enable button is to be placed. In addition, the user may select three guide blocks 414, 416, and 418 for the area where the emergency stop button is to be placed. In an embodiment, the selected guide blocks 412, 414, 416, and 418 may be highlighted or colored and displayed on the screen such that the guide block selected by the user can be easily noticed. In this case, the guide block in which the enable button is to be placed and the guide block in which the emergency stop button is to be disposed may be displayed in different colors from each other.

The second operation step 420 represents the enable button 422 and the emergency stop button 424 placed according to a user input. As illustrated, the enable button 422 may be placed on the same area as the guide block 412 selected by the user. In addition, the emergency stop button 424 may be placed on the same area as the guide blocks 414, 416, and 418 selected by the user.

By selecting the guide block displayed on the screen and placing the enable button and the emergency stop button, the user may determine the placement position, size, shape, and the like of the enable button and the emergency stop button to suit his or her taste.

Figure 5:
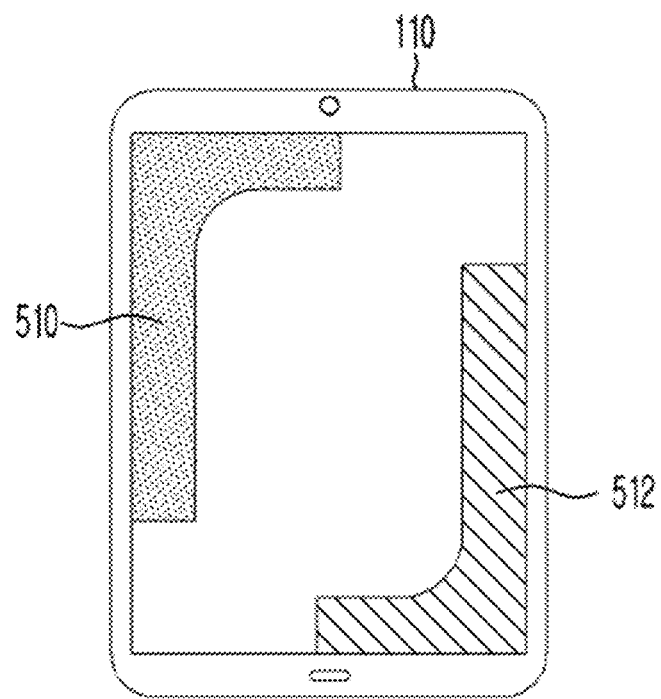
FIG. 5 is a diagram illustrating a placement of an enable button and an emergency stop button according to another embodiment of the present disclosure.

FIG. 5 is a diagram illustrating a placement of an enable button 510 and an emergency stop button 512 according to another embodiment of the present disclosure. In an embodiment, the user may change the size and shape of the enable button 510 and the emergency stop button 512 of the portable terminal 110. For example, the size and shape of each button may be changed by changing the selection of a plurality of guide blocks illustrated in FIGS. 4A and 4B. Additionally or alternatively, the size or shape of the enable button 510 and the emergency stop button 512 displayed on the screen may be modified through a touch input, a drag input, and the like.

Depending on users, the part of the portable terminal 110 that is grabbed by the user may be varied when the user holds the portable terminal 110 with one or both hands. Accordingly, each user may have different preferred button input position. According to the configuration described above, the user may adjust the positions, sizes, and shapes of the enable button 510 and the emergency stop button 512 according to his or her preferences, and accordingly, a user interface optimized for each user can be provided. Accordingly, the user can efficiently control the robot device using the portable terminal 110 and quickly cope with an emergency situation.

Figure 6:
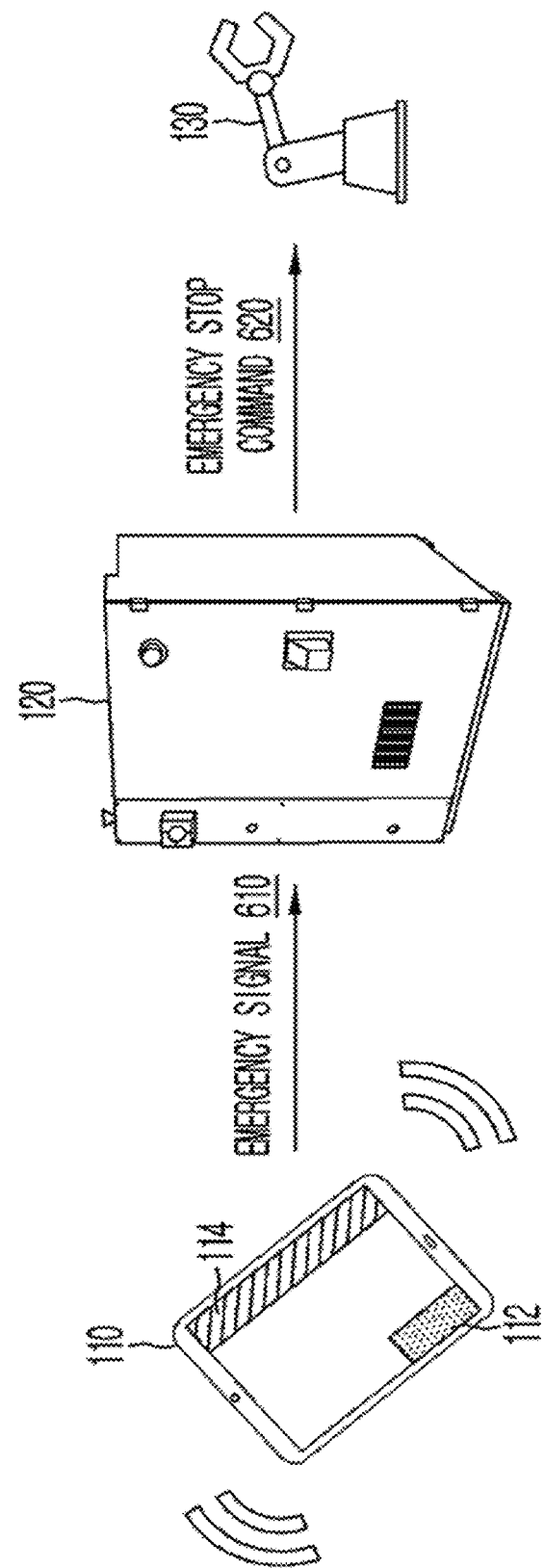
FIG. 6 is a diagram illustrating an example in which the portable terminal detects a fall or shaking of a threshold value or above, and transmits an emergency signal to a control device according to an exemplary embodiment.

FIG. 6 is a diagram illustrating an example in which the portable terminal 110 detects a fall or shaking of a threshold value or above, and transmits an emergency signal 610 to the control device 120 according to an exemplary embodiment. In an embodiment, the portable terminal 110 may include a motion sensor (e.g., an accelerometer, a gyroscope, a gravity sensor, and the like) for detecting a movement of the portable terminal. For example, the accelerometer measures acceleration generated according to the movement of the portable terminal 110, and the measured values are expressed as roll, pitch, and yaw. The roll value indicates the acceleration of the X-axis rotation of the portable terminal 110, the pitch value indicates the acceleration of the Y-axis rotation, and the yaw value indicates the acceleration of the Z-axis rotation. In an embodiment, when the accelerometer detects the fall or shaking of the portable terminal 110 of the threshold value or above, the portable terminal 110 may generate the emergency signal 610 and transmit it to the control device 120 without requiring the user to touch the emergency stop button 114. When receiving the emergency signal 610 from the portable terminal 110, the control device 120 may generate an emergency stop command 620 for stopping all operations of the robot device 130 and transmit it to the robot device 130. In this case, the robot device 130 receiving the emergency stop command 620 may stop all operations.

Additionally or alternatively, when the accelerometer or the gravity sensor detects a preset posture, the portable terminal 110 may generate an emergency stop command 620 for stopping all operations of the robot device 130 and transmit it to the control device 120. For example, when the user puts the portable terminal 110 down on a flat surface or mounts it on a cradle, the portable terminal 110 may detect such a posture, recognize it as a situation that the user has stopped controlling the robot, and generate the emergency signal 610 and transmit it to the control device 120.

Figure 7:
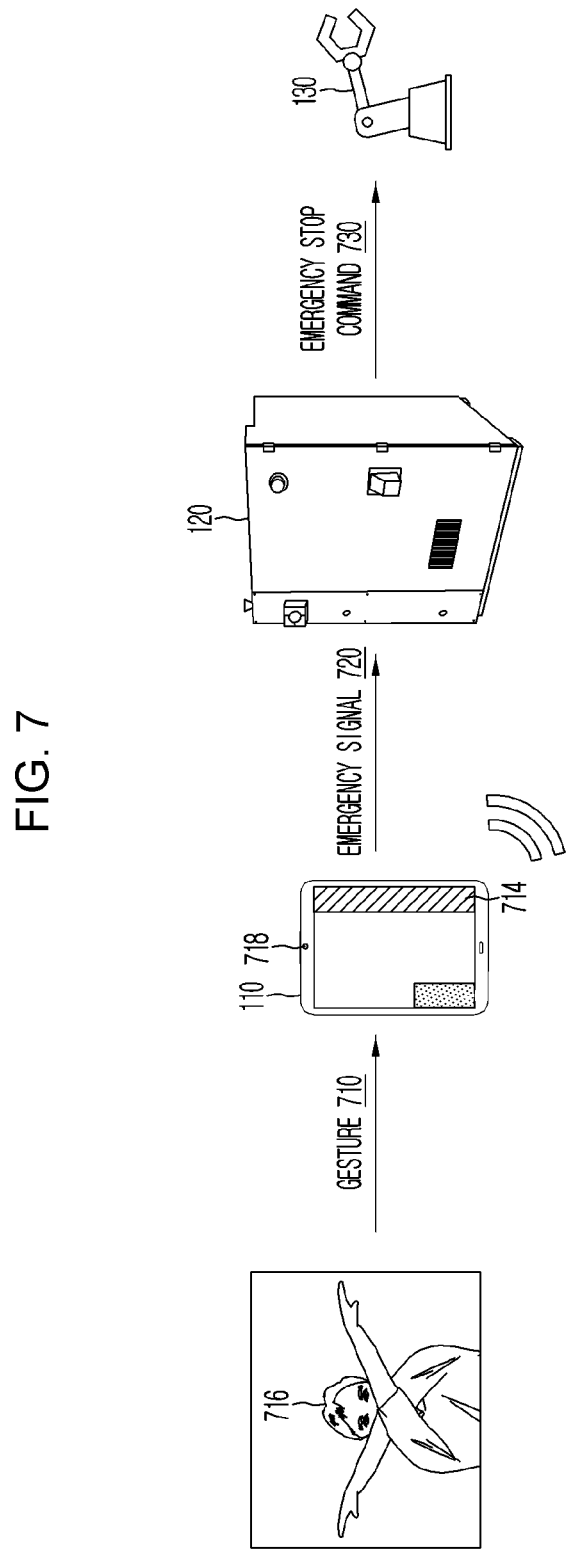
FIG. 7 is a diagram illustrating an example in which the portable terminal detects a gesture of the user and transmits an emergency signal to a control device according to an exemplary embodiment.

FIG. 7 is a diagram illustrating an example in which the portable terminal 110 detects a gesture 710 of a user 716 and transmits an emergency signal 720 to the control device 120 according to an exemplary embodiment. According to an embodiment, the portable terminal 110 may include an image sensor 718 and a processor for image processing. For example, the image sensor 718 may include a camera, a camcorder, a web cam, and the like, and may be disposed on a front or back side of the portable terminal 110.

As illustrated, the user 716 may make a predefined gesture 710 to stop all operations of the robot device 130 without holding the portable terminal 110. In this case, the image sensor 718 of the portable terminal 110 may detect the gesture 710 of the user 716. In response to detecting the gesture 710 of the user 716, the portable terminal 110 may generate the emergency signal 720 and transmit it to the control device 120.

When receiving the emergency signal 720, the control device 120 may generate an emergency stop command 730 for stopping all operations of the robot device 130 and transmit it to the robot device 130. In this case, the robot device 130 receiving the emergency stop command 730 may stop all operations. According to the configuration described above, without requiring the user to touch the emergency stop button 714, the portable terminal 110 may quickly stop the operation of the robot device 130 based on the gesture 710 of the user 716 in an emergency situation.

Figure 8:
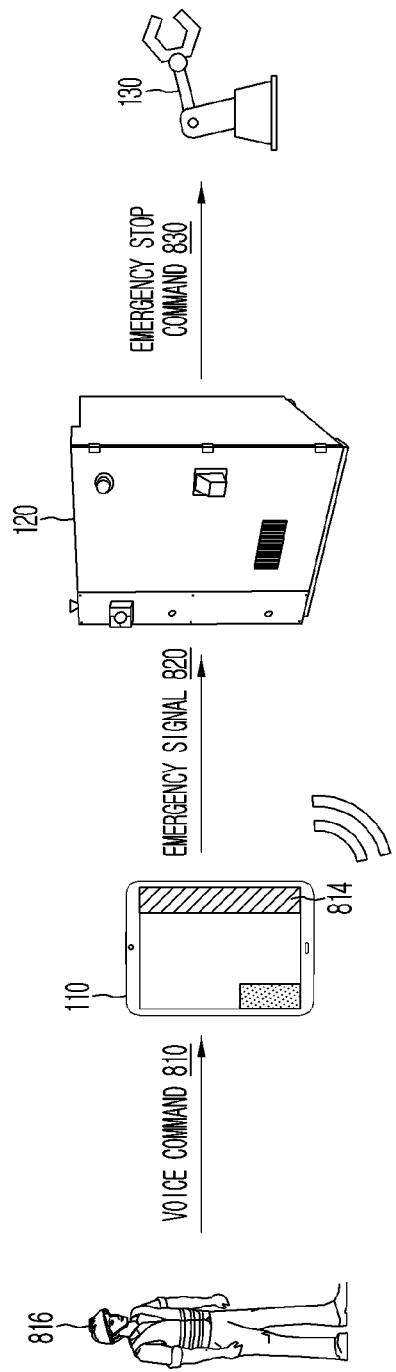
FIG. 8 is a diagram illustrating an example in which the portable terminal detects a voice command of the user and transmits an emergency signal to a control device according to an exemplary embodiment.

FIG. 8 is a diagram illustrating an example in which the portable terminal 110 detects a voice command 810 of a user 816 and transmits an emergency signal 820 to the control device 120 according to an exemplary embodiment. In an embodiment, the portable terminal 110 may be configured to include a sound sensor that receives a voice command of the user and a processor that processes the voice command. The portable terminal 110 may receive a voice command 810 from the user 816 and transmit a command corresponding to the voice command 810 to the control device 120.

As illustrated, the user 816 may utter the predefined voice command 810 to stop all operations of the robot device 130 without holding the portable terminal 110. For example, when the portable terminal 110 detects the voice command 810 such as "Cease", "No", "Discontinue", "Stop", the portable terminal 110 may generate the emergency signal 820 and transmit it to the control device 120. Additionally or alternatively, when the portable terminal 110 detects the onomatopoeic words "Argh", "Aaargh", "Aaaiiieeee", and the like of a certain decibel (dB) or higher, the portable terminal 110 may generate the emergency signal 820 and transmit it to the control device 120.

When receiving the emergency signal 820, the control device 120 may generate an emergency stop command 830 for stopping all operations of the robot device 130 and transmit it to the robot device 130. In this case, the robot device 130 receiving the emergency stop command 830 may stop all operations. According to the configuration described above, without requiring the user to touch the emergency stop button 814, the portable terminal 110 may quickly stop the operation of the robot device 130 based on the voice command 810 of the user 816 in an emergency situation.

Figure 9:
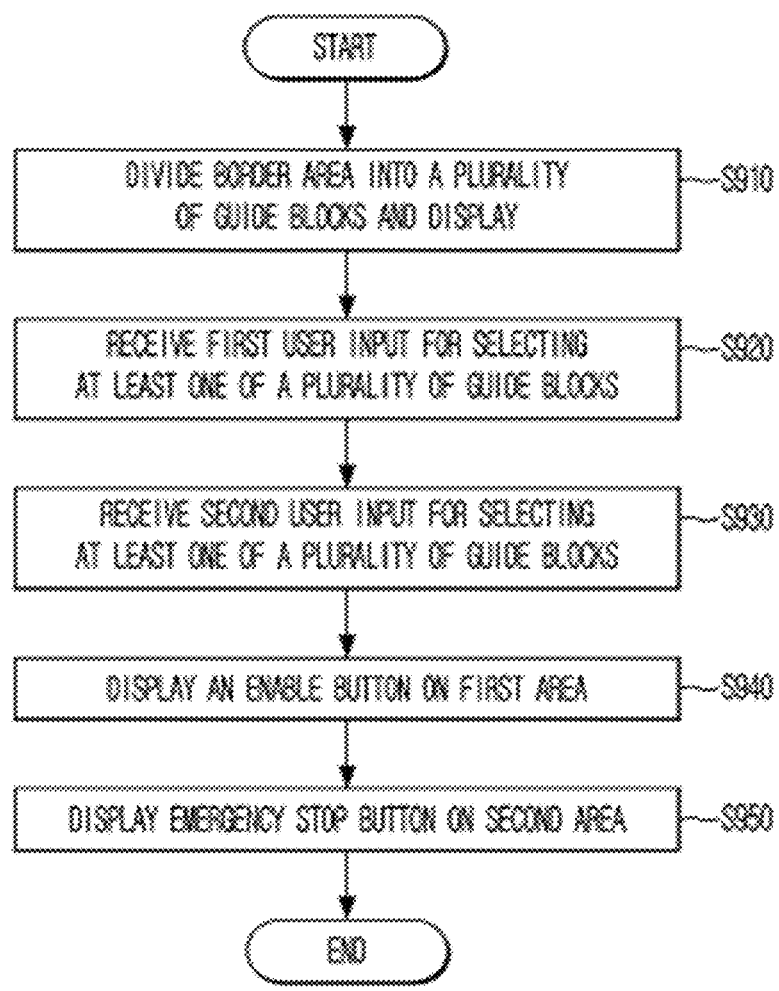
FIG. 9 is a flowchart illustrating a method for placing an enable button and an emergency stop button by a user according to an exemplary embodiment.

FIG. 9 is a flowchart illustrating a method for placing an enable button and an emergency stop button by a user according to an exemplary embodiment. The method for placing buttons may begin at S910, by dividing and displaying the border area of the portable terminal into a plurality of guide blocks. In this case, the portable terminal may receive a first user input for selecting at least one of a plurality of guide blocks on the screen (S920). Here, the first user input may be the one for determining the placement, size and shape of the enable button.

Next, the portable terminal may receive a second user input for selecting at least one of a plurality of guide blocks on the screen (S930). Here, the second user input may be the one for selecting a guide block different from the guide block selected by the first user input. The second user input may be the one for determining the placement, size and shape of the emergency stop button.

Based on the first and second user inputs, the portable terminal may display the enable button and the emergency stop button on the screen. Specifically, the portable terminal may display the enable button on the first area defined by the guide block(s) selected by the first user input (S940). In addition, the portable terminal may display the emergency stop button on the second area defined by the guide block(s) selected by the second user input (S950). According to the configuration described above, it is possible to provide a user interface optimized for each user, since the user may determine the positions, sizes, and shapes of the enable button and the emergency stop button displayed on the screen according to his or her preferences. In addition, it is possible to provide a method for controlling a robot device, which is capable of quickly responding to an emergency situation by, in response to detecting a registered posture of the user terminal, impact and shaking of the user terminal, a user gesture, a voice command, and the like by an accelerometer, an image sensor, a sound sensor, and the like of the user terminal, transmitting an emergency signal for stopping the operation of the robot device.

The preferred embodiments of the present invention described above are disclosed for purposes of illustration, and those skilled in the art with ordinary knowledge of the present invention will be able to make various modifications, changes and additions within the spirit and scope of the present invention, and such modifications, changes and additions should be construed to be included in a scope of the claims.

When those skilled in the art to which the present invention belongs, various substitutions, modifications, and changes are possible within the scope of the technical spirit of the present invention, and thus the present invention is not limited by the embodiments described above and the accompanying drawings.

What is claimed is:

1. A method for controlling a robot device using a portable terminal including a touchscreen, the method comprising:
   displaying a plurality of guide blocks, which are positioned on a border area that surrounds a central area of the touchscreen;
   receiving, from a user, a first user input selecting at least one guide block among the plurality of guide blocks positioned on the border area;
   displaying an enable button placed on a first area, which is identical to the at least one guide block selected by the first user input;
   receiving, from the user, a second user input selecting at least one of the plurality of guide blocks positioned on the border area;
   displaying an emergency stop button placed on a second area, which is identical to the at least one guide block selected by the second user input;
   displaying a plurality of robot control buttons placed on a third area, which is in the central area of the touchscreen;
   in response to simultaneously receiving, from the user, an input on the first area and an input on the third area, transmitting a robot control signal to a control device configured to control the robot device; and
   in response to receiving an input, from the user, on the second area, transmitting an emergency signal to the control device,
   wherein the emergency signal is a signal for stopping operation of the robot device.

2. The method according to claim 1, wherein,
   in a right-handed mode of the portable terminal, the enable button is displayed on a left side of the touchscreen, and the emergency stop button is displayed on a right side of the touchscreen, and
   in a left-handed mode of the portable terminal, the enable button is displayed on the right side of the touchscreen, and the emergency stop button is displayed on the left side of the touchscreen.

3. The method according to claim 1, wherein
   the size of the first area for displaying the enable button is changeable by the user, and
   the size of the second area for displaying the emergency stop button is changeable by the user.

4. The method according to claim 1, wherein
   the shape of the first area for displaying the enable button is changeable by the user, and
   the shape of the second area for displaying the emergency stop button is changeable by the user.

5. The method according to claim 1, further comprising, in response to detecting, by an accelerometer of the portable terminal, a fall, a shaking of the portable terminal of a predetermined threshold value or above, or a predetermined posture, transmitting the emergency signal to the control device.

6. The method according to claim 1, further comprising, in response to detecting a predetermined gesture by an image sensor of the portable terminal, transmitting the emergency signal to the control device.

7. The method according to claim 1, further comprising, in response to detecting a predetermined voice command by a sound sensor of the portable terminal, transmitting the emergency signal to the control device.

8. The method according to claim 1, wherein the portable terminal is a general-purpose tablet computer.

\* \* \* \* \*